May 27, 1969  E. V. KRING  3,446,671
FUEL CELL EMPLOYING AN ACIDIC CATHOLYTE CONTAINING
HYDROGEN PEROXIDE AND A PYROPHOSPHATE
Filed Feb. 25, 1963
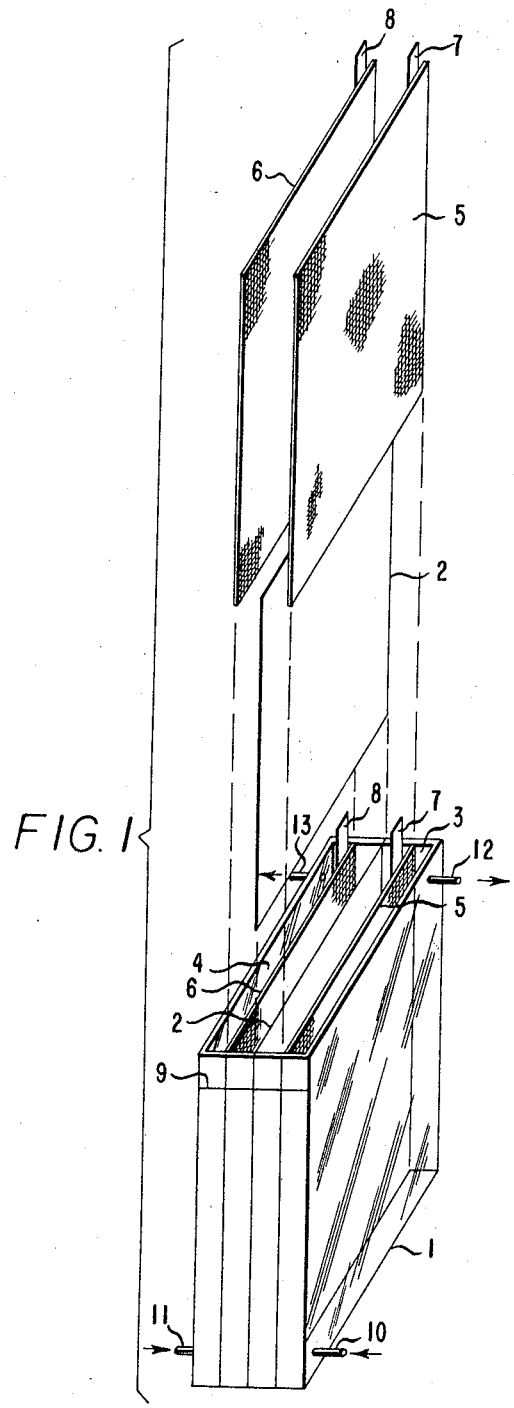
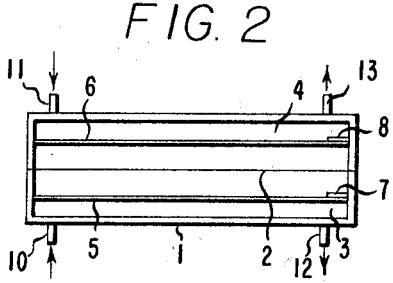
FIG. 2
INVENTOR
ELBERT V. KRING
BY
*Amos G. Cole*
AGENT 3,446,671

FUEL CELL EMPLOYING AN ACIDIC CATHOLYTE CONTAINING HYDROGEN PEROXIDE AND A PYROPHOSPHATE

Elbert V. Kring, Wilmington, Del., assignor to E. I. du Pont de Nemours and Company, Wilmington, Del., a corporation of Delaware
Filed Feb. 25, 1963, Ser. No. 260,497
Int. Cl. H01m 27/00
U.S. Cl. 136—86                                    3 Claims This invention relates to fuel cells and more particularly to fuel cells employing a peroxygen compound as oxidant in an acidic catholyte.

Fuel cells are devices for converting the free energy of chemical reactions into electrical energy as the chemical reactants are fed to the cell. My application Ser. No. 246,245, filed Dec. 20, 1962, describes fuel cells employing an acidic electrolyte such as a sulfuric acid solution divided by a membrane permeable to hydronium ions into a catholyte portion having dissolved therein a peroxygen compound such as hydrogen peroxide and an anolyte portion having dissolved therein a fuel such as methanol. This invention relates to improved catholyte compositions for use in such cells and to the fuel cells employing the improved catholyte compositions.

A fuel cell having active platinum electrodes and a 5 molar sulfuric acid solution as electrolyte with the catholyte portion containing hydrogen peroxide as oxidant and the anolyte portion containing methanol as fuel will have an open circuit voltage of about 0.5 volt and will deliver about 25 ma./cm.$^2$ at about 0.1 volt. It has been found that when such a cell is operated under high load conditions, e.g., more than about 600 ma./cm.$^2$, a phenomenon of cathode pulsation occurs about every 3 to 5 minutes. This involves a slow decay or decrease in current and the peroxide half cell voltage until both reach minimums, at which time the pulse occurs. At pulsation, the catholyte becomes clear of gas bubbles, the current and voltage surge to approximately their original values or higher and the pulsing cycle repeats itself. Such a periodic decay in current and voltage which occurs only when the cell is operated under heavy load conditions, i.e., when delivering more than about 600 ma./cm.$^2$, is obviously disadvantageous.

It is an object of the invention to provide a way of effectively reducing the periodic decay in current and voltage that occurs when fuel cells of the above type are employed under heavy load conditions. A particular object is to provide an improved acid catholyte, whose use in such cells, results in a substantial reduction in the decay of current and voltage under heavy load conditions. Further objects will be apparent from the following description.

The improved catholyte of the invention is a 0.1 to 10 molar aqueous solution of a protonic acid having dissolved therein a peroxygen compound at a concentration of 0.01 to 20 molar and also a pyrophosphate at such a concentration as to provide at least 0.002 mole of pyrophosphate per mole of peroxygen compound. The preferred catholytes will contain the acid at a 1 to 10, most preferably 2 to 7, molar concentration, the peroxygen compound at a 0.5 to 2.0 molar concentration, and the pyrophosphate at a concentration to provide from 0.005 to 0.035, most preferably 0.006 to 0.02 mole of pyrophosphate per mole of peroxygen compound. Still higher proportions of the pyrophosphate can be used.

The acid component of the catholyte, which will be the same as the acid component of the anolyte, may be any protonic acid, i.e., any substance which gives hydronium ions (H$_3$O$^+$) in aqueous solution, which acid has the required solubility in water, does not adversely affect the electrodes or the membrane employed to separate the electrolyte into catholyte and anolyte portions, does not react with the peroxygen compound to destroy its oxidizing power, does not react with the fuel to destroy its reducing power and which gives aqueous solutions in which the peroxygen compound and the pyrophosphate are soluble. Examples of such acids are sulfuric acid, phosphoric acid and the 2 to 4 carbon aliphatic carboxylic acids such as acetic and propionic acids. The preferred acid is sulfuric acid.

The peroxygen compound employed in the catholyte is most preferably hydrogen peroxide although other peroxygen compounds such as peroxyformic acid, peroxyacetic acid, peroxypropionic acid, peroxymonosulfuric acid (H$_2$SO$_5$, Caro's acid), and potassium peroxymonosulfate can be used.

The pyrophosphate compound can be pyrophosphoric acid (H$_4$P$_2$O$_7$) or a water soluble salt thereof such as the alkali metal pyrophosphates and acid pyrophosphates, examples of which are sodium pyrophosphate (Na$_4$P$_2$O$_7$) and sodium dihydrogen pyrophosphate (Na$_2$H$_2$P$_2$O$_7$).

Methanol is the preferred fuel and will generally be employed in the acidic anolyte at a concentration of at least 0.1 molar with concentrations of 0.75 to 13 molar being preferred. Still higher concentrations can be used. Other fuels that can be used are ethanol, the propanols, the butanols, allyl alcohol, ethylene glycol, glycerine, sucrose, formaldehyde, acetaldehyde, formic acid, and the like compounds.

The main electrochemical reactions occurring at and catalyzed by the electrodes during operation of the fuel cell are believed to be indicated by the following equations when using hydrogen peroxide as the peroxygen compound and methanol as the fuel. Methanol is oxidized at the anode as follows:

$$CH_3OH + H_2O = CO_2 + 6H^+ + 6e^-$$

The resulting hydrogen ions migrate (as hydronium ions, H$_3$O$^+$) through the permeable membrane where the hydrogen peroxide is reduced at the cathode as follows:

$$3H_2O_2 + 6H^+ + 6e^- = 6H_2O$$

The electrons liberated at the anode flow to the cathode when the electrodes are connected through an external electrical circuit. The over-all cell reaction can be represented as follows:

$$3H_2O_2 + CH_3OH \rightarrow CO_2 + 5H_2O + \text{electrical energy}$$

The cell electrodes may be made of any material which catalyzes the electrochemical reactions involved. Platinized surfaces such as those deposited by electroplating are suitable for the catalytically active surfaces of both electrodes. Any solid electroconductive material which is resistant to the acid electrolyte can be used as the electrode base material upon which such platinum surface is electrodeposited. Examples of such base materials are stainless steel, nickel, titanium or platinum plates or screens; gold, porous carbon and various acid-resistant polymer compositions such as polytetrafluoroethylene, polyethylene, polystyrene and polyacrylate compositions having high loadings of graphite.

The membrane employed to separate the electrolyte into anolyte and catholyte portions must be permeable to hydronium ions but impermeable to the peroxygen compound and fuel. It should also resist attack by the acidic electrolyte, the peroxygen compound and the fuel. The membrane generally will be made of a cation exchange resin. Examples of such suitable resins are those having functional carboxylic, phosphonic or sulfonic acid groups. The sulfonic acid cation exchange resins and particularly those in which the sulfonic acid groups are attached directly to the aromatic nuclei of a copolymer of a monovinyl aromatic hydrocarbon such as styrene and a polyvinyl aromatic hydrocarbon such as divinylbenzene are preferred because of their high effectiveness and excellent stability. In such nuclear sulfonated copolymers, the divinylbenzene component functions as a crosslinking component and will usually constitute from about 1 to 16% of the copolymer weight. Cation exchange resins of this type and membranes made thereof for use in fuel cells are well known and available commercially.

The drawings illustrate a fuel cell in which the present improved catholyte may be employed. FIG. 1 is a perspective view with certain parts shown in exploded form and FIG. 2 is a plan view of the cell.

In the drawings, 1 is a container made of a clear polymethyl acrylate resin, although other materials of construction, such as glass, which are non-conductors of electricity and resistant to the catholyte and anolyte, can be used. Membrane 2, made of a sulfonated copolymer of styrene and divinylbenzene, divides container 1 into anolyte compartment 3 and catholyte compartment 4. Anode 5 bearing connector tab 7 is positioned in anolyte compartment 3, while cathode 6 bearing connector tab 8 is positioned in catholyte compartment 4. Anode 5 and cathode 6 are stainless steel screens having active platinum surfaces electrodeposited from a chloroplatinic acid plating solution. Line 9 indicates the electrolyte level. Fresh anolyte and catholyte, respectively, are fed to the cell by way of tubes 10 and 11 while spent anolyte and catholyte, respectively, are removed from the cell by way of tubes 12 and 13.

The cathode pulsation phenomenon mentioned above is readily observed when the peroxide half cell is operated against an anode such as lead in an acidic anolyte. A cathode consisting of a stainless steel screen having an electro-deposited platinum surface was positioned in a 5 molar sulfuric acid solution containing hydrogen peroxide at 1 molar concentration and sodium pyrophosphate equal to 0.00006 mole thereof per mole $H_2O_2$. The resulting peroxide half cell was combined with a lead anode in a 5 molar sulfuric acid anolyte separated from the catholyte of the half cell by a cation exchange membrane which was a sulfonated copolymer of styrene and divinylbenzene. The current delivered by the cell was measured by a milliameter connected in series with a variable resistor across the cell. The open circuit voltage was determined using an oscilliscope through an interruptor circuit.

At a loading of 800 ma./cm.$^2$, the above half cell had an initial voltage of 0.7 volt (vs. $H_2$). However, both the voltage and current began decaying slowly until after 5 minutes the voltage had decreased to a minimum of 0.2 volt. At that point, the cathode pulsation occurred with the catholyte clearing of gas bubbles. After 1 additional minute, the voltage had surged to 0.83 volt and the current was 1000 ma./cm.$^2$. Such cyclic pulsing with periodic decay then recovery of voltage and current continued so long as the cell remained under heavy load conditions and the composition of the catholyte was maintained constant.

The above cell was then altered by employing a catholyte which differed from the above catholyte only in that it contained 0.006 mole of sodium pyrophosphate per mole of $H_2O_2$. When so altered, the initial half cell voltage at a loading of 800 ma./cm.$^2$ was again 0.7 volt. Again the voltage and current decreased slowly until after 5 minutes a minimum voltage of 0.37 volt was reached. At that point, the cathode pulsation occurred and in 1 additional minute the voltage had surged to 0.83 volt and the current was 1000 ma./cm.$^2$. Again, such cyclic pulsing with periodic decay and recovery of voltage and current continued so long as the cell remained under heavy load conditions and the composition of the catholyte was maintained constant.

The above results demonstrate that the higher concentration of pyrophosphate in the second catholyte solution reduced substantially the extent of the voltage decay. Thus, at the point of maximum decay the voltage was 0.37 volt compared to only 0.2 volt for the first catholyte containing pyrophosphate at the lower concentration. The difference of 0.17 volt in favor of the higher concentration of pyrophosphate constitutes a highly significant improvement. A similar improvement is obtained when the peroxide half cell containing the higher pyrophosphate concentration is combined with an active platinum anode in an acidic anolyte containing a fuel such as methanol to give a fuel cell such as that illustrated in the drawing.

In operating peroxide/methanol fuel cells of the above type, it has been observed that when the acidic peroxide catholyte contains little if any pyrophosphate, the cell is essentially incapable of operation at loads greater than about 600 ma./cm.$^2$. It has been further observed that while loadings up to 800 ma./cm.$^2$ and higher are possible when the peroxide catholyte contains about 0.00006 mole pyrophosphate per mole of $H_2O_2$, excessive periodic voltage decay occurs at such high loadings. The invention is based upon the discovery that such periodic decay in voltage can be overcome to a substantial and worthwhile extent by having present in the acidic peroxide catholyte a pyrophosphate at a concentration corresponding to at least 0.002 mole, preferably 0.005 to 0.035 mole, per mole of hydrogen peroxide. The beneficial effect of the pyrophosphate when used in the above concentrations was entirely unexpected.

The embodiments of the invention in which an exclusive property or privilege is claimed are as follows:

1. In a fuel cell, the combination of an acidic catholyte having hydrogen peroxide dissolved therein and an acidic anolyte having a fuel dissolved therein, said catholyte and anolyte being separated by a cation exchange resin membrane, and said catholyte being a 0.1 to 10 molar aqueous solution of sulfuric acid or phosphoric acid containing dissolved therein hydrogen peroxide at a concentration of 0.01 to 20 molar and pyrophosphoric acid or an alkali metal salt thereof at a concentration corresponding to at least 0.002 mol per mol of said hydrogen peroxide.

2. The fuel cell combination of claim 1 wherein the catholyte is a 0.1 to 10 molar aqueous solution of sulfuric acid containing dissolved therein hydrogen peroxide at a concentration of 0.01 to 20 molar and sodium pyrophosphate at a concentration of at least 0.002 mol per mol of said hydrogen peroxide.

3. The fuel cell combination of claim 1 wherein the catholyte is a 0.1 to 10 molar aqueous solution of sulfuric acid containing dissolved therein hydrogen peroxide at a concentration of 0.01 to 20 molar and sodium pyrophosphate at a concentration of 0.005 to 0.035 mol per mol of said hydrogen peroxide.

References Cited

UNITED STATES PATENTS

| | | | |
|---|---|---|---|
| 3,113,049 | 12/1963 | Worsham | 136—86 |
| 3,163,560 | 12/1964 | Grimes et al. | 136—86 |
| 3,220,887 | 11/1965 | Delahunt et al. | 136—86 |
| 3,245,890 | 4/1966 | Klass | 136—86 |
| 2,027,838 | 1/1936 | Reichert | 23—207.5 |

WINSTON A. DOUGLAS, Primary Examiner.

HUGH A. FEELEY, Assistant Examiner.

U.S. Cl. X.R.

23—207; 136—154